United States Patent [19]

Dukes

[11] Patent Number: 5,301,332
[45] Date of Patent: Apr. 5, 1994

[54] METHOD AND APPARATUS FOR A DYNAMIC, TIMED-LOOP ARBITRATION

[75] Inventor: Glenn E. Dukes, Sunnyvale, Calif.
[73] Assignee: NCR Corporation, Dayton, Ohio
[21] Appl. No.: 995,731
[22] Filed: Dec. 23, 1992
[51] Int. Cl.$^5$ .............................................. G06F 13/14
[52] U.S. Cl. ............................ 395/725; 364/DIG. 1; 364/242.6; 364/242.8; 364/242
[58] Field of Search ................. 395/725, 325, 425

[56] References Cited

U.S. PATENT DOCUMENTS

| | | | |
|---|---|---|---|
| 4,237,534 | 12/1980 | Felix | 395/325 |
| 4,257,095 | 3/1981 | Nadir | 395/325 |
| 4,400,771 | 8/1983 | Suzuki et al. | 395/425 |
| 4,449,183 | 5/1984 | Flahive et al. | 395/425 |
| 4,597,054 | 6/1986 | Lockwood et al. | 395/725 |
| 4,719,569 | 1/1988 | Ludemann et al. | 395/725 |
| 4,787,033 | 11/1988 | Bomba et al. | 395/325 |
| 4,814,974 | 3/1989 | Narayanan et al. | 395/725 |
| 4,831,523 | 5/1989 | Lewis et al. | 395/275 |
| 4,858,116 | 8/1989 | Gillett, Jr. et al. | 395/325 |
| 4,991,084 | 2/1991 | Rodiger et al. | 395/725 |
| 5,193,193 | 3/1993 | Iyer | 395/725 |

*Primary Examiner*—Debra A. Chun
*Attorney, Agent, or Firm*—Jack R. Penrod

[57] ABSTRACT

In a computer system where maximum allowable latency periods are established for each of eight agents to access a shared buffer, the invention provides a timed loop that prevents starving out of any agent and a dynamically variable loop to prevent an allocation of time for an access to the shared buffer by an idle agent to reduce latency wherever possible.

10 Claims, 11 Drawing Sheets

METHOD AND APPARATUS FOR A DYNAMIC, TIMED-LOOP ARBITRATION

BACKGROUND OF THE INVENTION

The present invention relates to a multiple processor computer system, and more particularly to a method and apparatus for controlling data transfers into and out of an input/output processor that is shared by a number of other processors and controllers in a computer system.

Typically, a multiple processor computer system has multiple central processing units (CPUs) and one or more controllers, such as a direct memory access controller. Additionally, a multiple processor computer system has certain assets that are shared by the CPUs and controllers. System buses, main memories and input/output channels are some examples of such shared assets.

Shared assets are typically shared for two reasons: to provide access to shared data, and to reduce cost by time sharing an asset among the CPUs instead of providing each of the multiple CPUs with its own respective asset. A very common problem with shared assets within a system, is how the use of a shared asset is allocated among the CPUs and controllers that want to access the shared asset. Unstructured allocation of a shared asset typically results in domination by one processor to the detriment of the other processors that need the shared asset. Structured allocation of a shared asset prevents domination of a shared process by one processor to the detriment of competing processors and controllers. Structured allocation schemes called arbitration methods are well known and widely used; however, each of the known arbitration methods has some type of limitation that reduces throughput of data to and from a shared asset.

A very simple arbitration method is to assign each processor and each controller a unique priority level. When a shared asset is available, the shared asset is allocated to the processor or controller with the highest priority level that is awaiting that asset. The problem with this type of arbitration method is that in busy systems the lowest priority processor or controller is "starved out" because it never makes it to that "highest priority level awaiting" that is allocated to the shared asset.

Another simple arbitration method is the timed loop arbitration method in which each processor or controller is automatically allocated a period of time of the shared resource whether it needs it or not. This removes the "starve out" problem. This arbitration method, however, has a problem of data latency, that is there can be a long wait between allocated periods and the data awaiting to be transferred may be no longer valid.

In view of the limitations of the known arbitration methods, it is an object of the present invention to provide an arbitration method that does not starve any processor or controller out and has a low data latency time.

It is another object of the present invention to provide an arbitration method that may be dynamically adjusted to improve the data flow to and from a shared asset.

SUMMARY OF THE INVENTION

Briefly stated, in accordance with one aspect of the invention the foregoing objects are achieved by providing a method of sharing access to a shared resource among a plurality of agents, each having a relative priority. The method comprises the steps of providing unlimited access to said shared resource if only a first agent of said plurality of agents has requested access to said shared resource, starting a timer if there is an unfulfilled request for the shared resource by a second agent. After the timer reaches a value that is predetermined for its agent, the access of the first agent is terminated and an access by an agent having a subsequent priority is facilitated.

In another embodiment of the invention, a circuit is provided for controlling access to a shared resource among a plurality of agents, each having a priority. This circuit includes means for providing access to said shared resource if only a first agent of the plurality of agents has requested access to said shared resource; means for starting a timer if there is an unfulfilled request for the shared resource by a second agent; and means for terminating the access of the first agent after said timer reaches a predetermined value and means for facilitating access an agent having a subsequent priority is provided.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
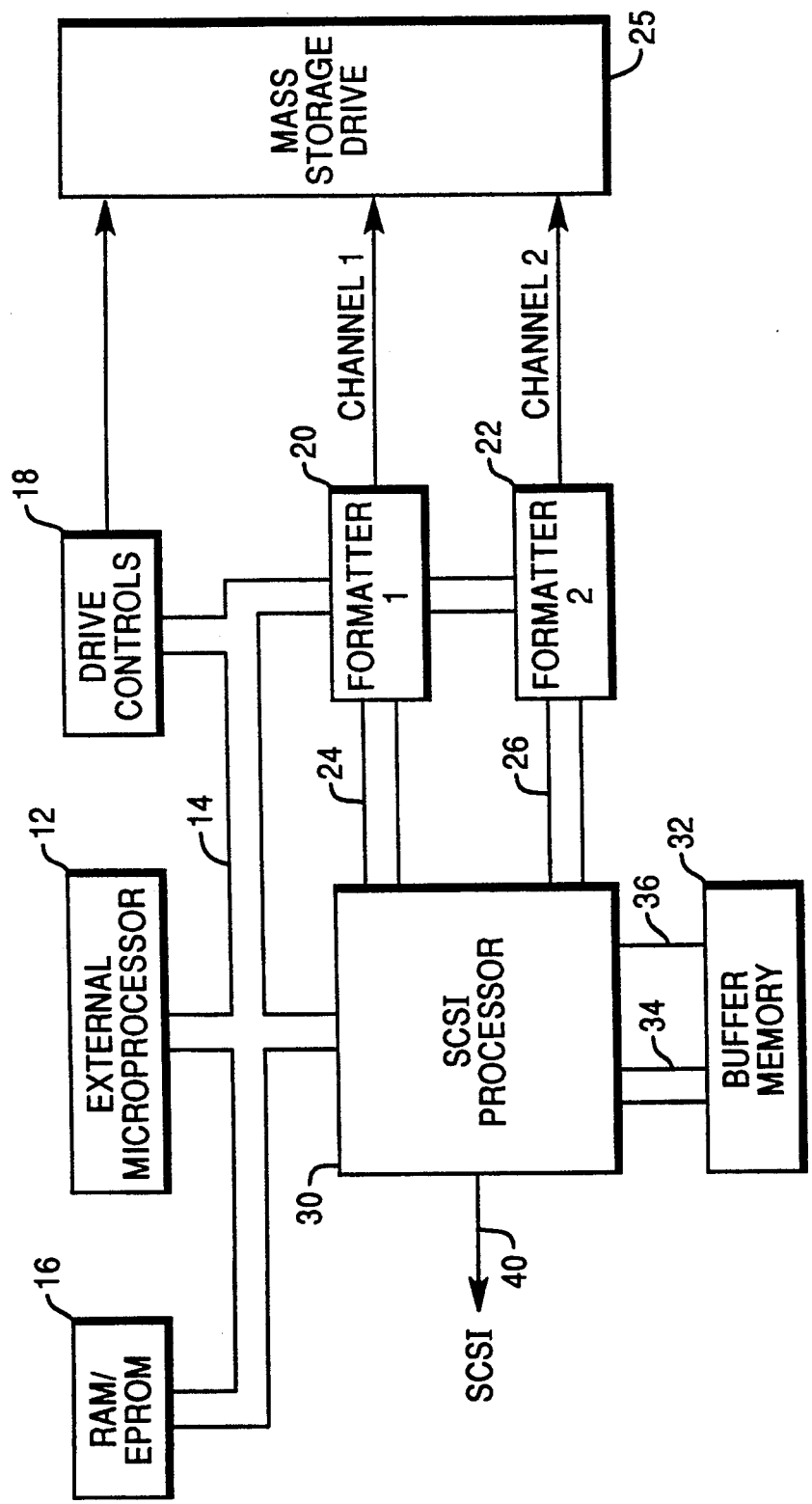
FIG. 1 is a block diagram of a computer system that includes a circuit in accordance with the invention.

Referring now to FIG. 1, a computer system 10 is shown. Computer system 10 has a microprocessor 12 connected to a system bus 14. System bus 14 is also connected to main memory 16 which contains random access memory (RAM), and may contain read only memory (ROM) as well. System bus 14 is additionally connected to drive controller 18, formatter 20 and formatter 22. Drive controller 18 and formatters 20, 22 are connected to a data drive 25, which is a mass storage device. Further, the system bus 14 is connected to a SCSI processor 30. The SCSI processor 30 is connected to a buffer memory 32 by address-and-data bus 34 and control bus 36. Also, SCSI processor 30 is connected to formatters 20, 22 by buses 24, 26 respectively. Further, SCSI processor 30 is connected to a SCSI2 bus 40. Connected in this manner, SCSI controller 30 can transfer data between the high speed SCSI2 bus 40 the mass storage drive 25 using the drive controller 18 to provide the mechanics of locating the data on the disk storage media (not shown) and one or both of the formatters 20, 22 to format the transferred data appropriately for either the storage media if the operation is a write to disk, or for the buffer memory 32 with error correction code operation (ECC) if the operation is a read from the mass storage drive 25.

Figure 2:
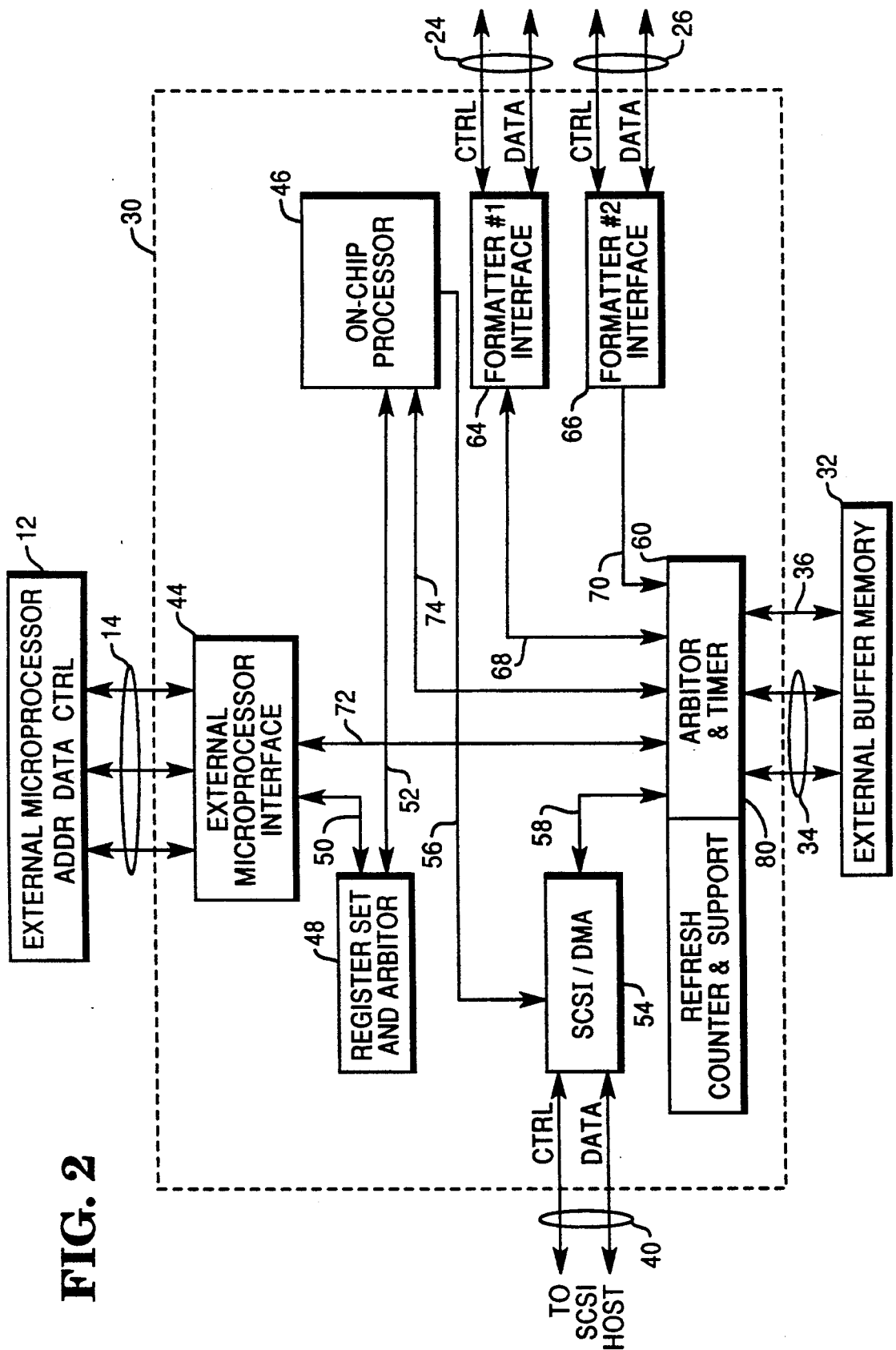
FIG. 2 is a block diagram of a digital circuit for controlling access to a shared asset, such as a buffer memory, according to the present invention.

Referring now to FIG. 2, further details of the SCSI processor 30 are shown. SCSI processor 30 has an external microprocessor interface 44 which is connected to address lines, data lines and control lines of system bus 14. By external microprocessor interface 44, the microprocessor 12 (shown in FIG. 1) can transfer data to and from addresses that are assigned to the SCSI processor 30.

SCSI processor 30 has an on-chip processor 46 that controls most of the functions of the SCSI controller 30 during normal operation. On-chip processor 46 performs general purpose processor functions for the SCSI processor 30 and also performs SCRIPTS processor functions that are specific functions for SCSI applications, as will be explained below.

SCSI processor 30 also has a register set 48. Register set 48 has numerous registers that hold operand and status data bits for control of the SCSI processor 30. Register set 48 is connected to the external microprocessor interface 44 by bus 50. Over bus 50, microprocessor 12 can load initial values into the operating registers of the register set 48 or check the status bits in the various registers to determine if an error has occurred that requires intervention by the microprocessor 12. Register set 48 is also connected by bus 52 to on-chip processor 46. Over bus 52, on-chip processor 46 can access the operating data stored there by the microprocessor 12, e.g. data stored during initialization, and access the status information to keep current on the status of the SCSI processor 30.

As its name implies, the SCSI processor 30 has a SCSI-DMA controller 54 as a part thereof. SCSI-DMA controller 54 is connected to the SCSI2 bus 40 for receiving and transmitting data. SCSI-DMA controller 54 has a SCSI2 interface which performs all of the SCSI protocol at the hardware link level. This SCSI2 interface can be a standard cell, such as a 16 bit wide 53C80 cell available from Microelectronics Division of NCR Corporation, Dayton, Ohio. SCSI-DMA controller 54 is connected to on-chip processor 46 by bus 56. The on-chip processor 46 provides control of the SCSI2 interface that the interface cannot provide for itself for data transfers with the SCSI2 bus 40.

SCSI-DMA controller 54 also includes a DMA controller that is especially helpful for transferring blocks of data to or from the SCSI2 bus 40. The DMA controller logically is located between the SCSI2 interface and a buffer memory interface 60 that it is connected to by bus 58.

Buffer interface 60 is connected to external buffer memory 32 by buses 34 and 36. Through bus 58, buffer interface 60 and buses 34, 36; DMA controller portion of the SCSI-DMA controller 54 can access external buffer memory 32 in order to temporarily store data received from the SCSI2 bus 40, or to retrieve data that has been stored there to be transmitted over the SCSI2 bus 40. The buffer interface 60 will be described further below.

SCSI processor 30 has at least one formatter interface 64, and in the preferred embodiment also has a second formatter interface 66. The formatter interfaces 64, 66 are connected to external formatters 20, 22 by buses 24, 26. The formatter interfaces 64, 66 transfer multibit parallel data to or from external formatters 20,22. For a transfer to one of the formatters 20, 22, the parallel data is transformed by the formatters 20, 22 to serial data. This transformation may include the addition of error correcting code (ECC) bits into the serial data. The serial data, including any ECC bits, is subsequently stored in the mass storage drive 25 (shown in FIG. 1). For a transfer from one of the formatters 20, 22, the serial data stream, including any ECC bits, is transformed by one of the formatters 20, 22 into parallel data words that are received over one of the buses 24, 26 by a respective formatter interface 64, 66. If a correctable error was detected in the serial bit stream, an error correcting word is transmitted from the formatter 22, 24 that transferred the parallel data stream to the respective formatter interface 64, 66. In this manner, a large quantity of data may be transmitted or received by the formatter interfaces 64, 66 with very low probability of error.

Formatter interfaces 64, 66 are connected by buses 68, 70, which are internal buses, to buffer interface 60. By buses 68, 70, buffer interface 60 and buses 34, 36, large quantities of data may be transferred from the buffer memory 30 and the mass storage drive 25 (not shown in FIG. 2). Buffer memory 30 can be used to store blocks of data to be transferred between the formatter interfaces 64, 66 of SCSI processor 30 and the mass storage drive 25. Similarly, ECC data may be transferred between the formatter interfaces 64, 66 and the formatters 20, 22 and transferred across buses 68, 70 through buffer interface 60 to buffer memory 30.

Buffer interface 60, besides being connected to the SCSI-DMA controller 54 by bus 58 and formatter interfaces 64, 66 by buses 68, 70 respectively, is connected to the external microprocessor interface 44 by bus 74 and to the on-chip processor 46 by bus 74. This means that at sometime in typical operation accesses to the buffer memory 32 through buffer interface 60 may be requested by microprocessor 12, on-chip processor 46, SCSI-DMA controller 54 and formatters 20, 22. Microprocessor 12, on-chip processor 46, SCSI-DMA controller 54 and formatters 20, 22 shall be collectively referred to hereinafter as agents. Further, if the buffer memory is a dynamic random access memory that requires periodic refreshing, then a refresh access request will occur also. Buffer interface 60 includes two counters, the first counts through the RAM addresses and always holds the address of the RAM data element to be refreshed next, and second counts to a predetermined value and then requests a buffer memory access to refresh the cell indicated in the first counter. Once the second counter reaches the predetermined value, it starts over rather than waiting until the request is granted. This prevents acceptable delays incurred during refreshing of some RAM data elements from accumulating into an unacceptable delay for a subsequent RAM data element.

Sometimes, two or more of these requests may occur at the same time, or two or more requests may overlap which means that one request for access will have to wait until the current access is ended. To manage all these requests, buffer interface 60 includes an arbiter and timer circuit 80 that provides a dynamic timed loop arbitration and follows a timed loop arbitration method to prevent domination by any of the agents 12, 20, 22, 46, 54 and limit data latency to acceptable levels according to the invention.

Figure 3:
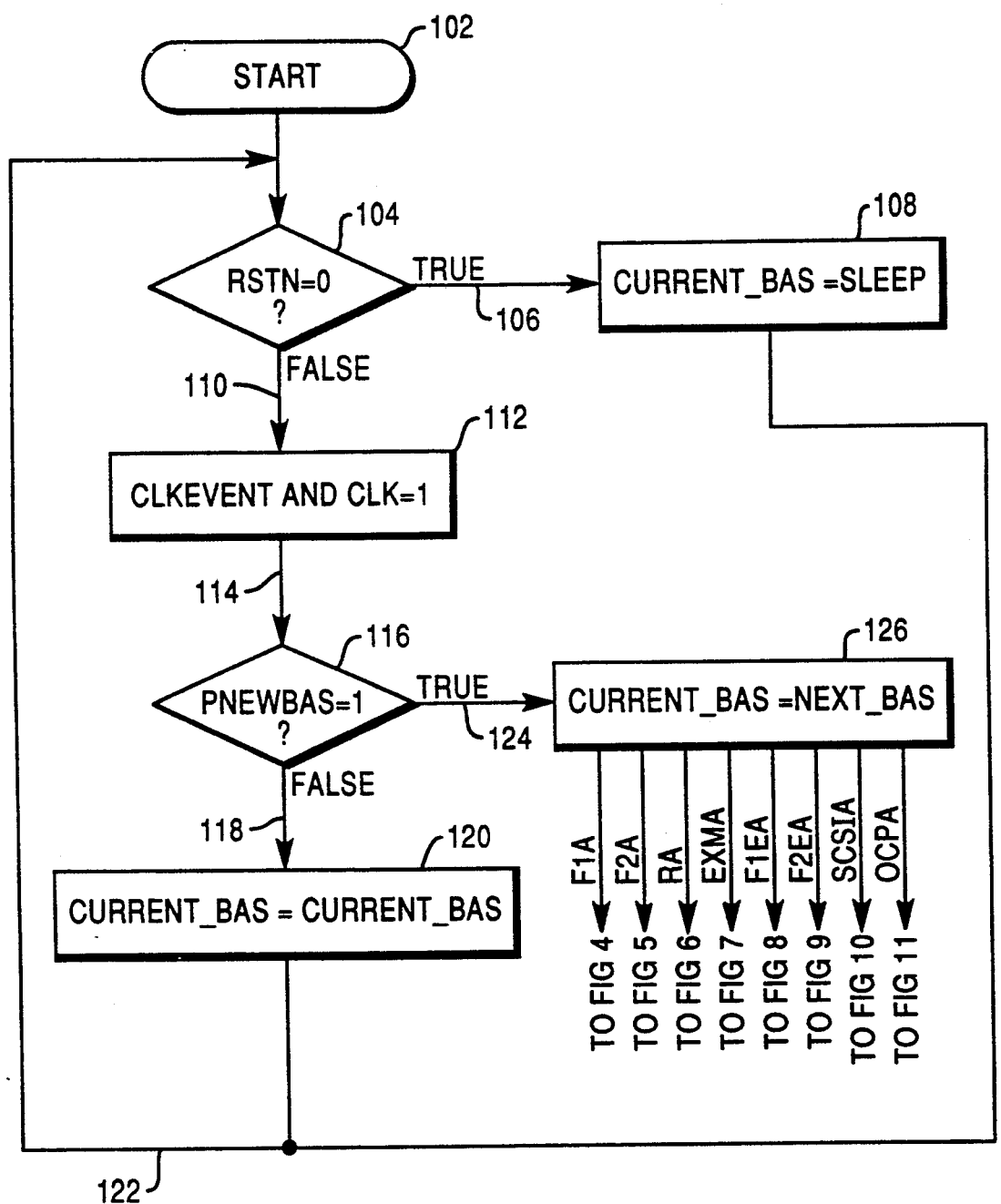
FIG. 3 is a flow chart illustrating a method for controlling access to a shared asset according to the present invention.

Referring now to FIG. 3, the method of accessing a shared asset, such as buffer memory 32 shown in FIG. 2, by one or more of the agents 12, 20, 22, 46, and 54 will be described. Assuming a non-active start state 102 the method 100 sequences to an action 104 where a reset bit (RSTN) is tested to see if it is asserted, i.e. if a reset is commanded. If a reset is not commanded, the method follows path 106 to the action at 108, where the current buffer arbiter state (current_bas) is set to the sleep state. The sleep state is terminated synchronously. After awakening, the method returns to the action at 104 to test again for a reset state.

If RSTN does not equal zero, then the method follows path 110 to action 112 where both the clock event signal (CLKEVENT) and to the clock signal (CLK) are equal to logic 1s, i.e. at the rising edge of the clock signal, after which the method 100 follows path 114 to action 116. Action 116 tests a process new buffer arbiter state (PNEWBAS) to determine if a new buffer arbiter state is required. If there is no need to process a new buffer arbiter state, i.e. PNEWBAS does not equal 1, then the method 100 follows path 118 to action 120 where current_bas is assigned the value of itself, i.e. the current_bas value does not change. After action 120, method 100 follows path 122 to the action 104, where the RSTN bit is tested.

If it is necessary to process a new buffer arbiter state, i.e. PNEWBAS is equal to 1, then the method 100 follows path 124 to action 126 where current_bas is assigned the value of the next buffer arbiter state (next_bas). The next buffer arbiter state signal has at least eight possible states, the state of which indicates which agent has current control of the shared buffer memory and also indicates the arbitration scheme that will be followed to determine the subsequent controlling agents from a group of one or more currently requesting agents.

The next_bas that is assigned to current_bas at action 126 is determined by selecting the state that corresponds to the highest priority state of all agents actively requesting access to the shared buffer memory. Formatter 1 interface access (F1A) is requested by setting F1REQ. Formatter 2 interface access (F2A) is requested by setting F2REQ. Refresh memory access (RA) is requested by setting RREQ. External microprocessor access (EXMA) is requested by setting EXMREQ. Formatter 1 error access (F1EA) is requested by setting F1EREQ. Formatter 2 error access (F2EA) is requested by setting F2EREQ. SCSI access (SCSIA) is requested by setting SCSIREQ. On-chip processor access (OCPA) is requested by setting OCPREQ. After this determination is made, logic processing that corresponds to the current_bas determines subsequent next_bas states. From action 126, method 100 branches to FIG. 4 if current_bas is F1A, FIG. 5 if current_bas is F2A, FIG. 6 if current_bas is RA, FIG. 7 if current_bas is EXMA, FIG. 8 if current_bas is F1EA, FIG. 9 if current_bas is F2EA, FIG. 10 if current_bas is SCSIA, and FIG. 11 if current_bas is OCPA. As shown in FIGS. 4-11, once buffer arbitration processing on one or more requests, the priority of each agent changes according to which of the agents is currently accessing the shared buffer memory 32.

Figure 4:
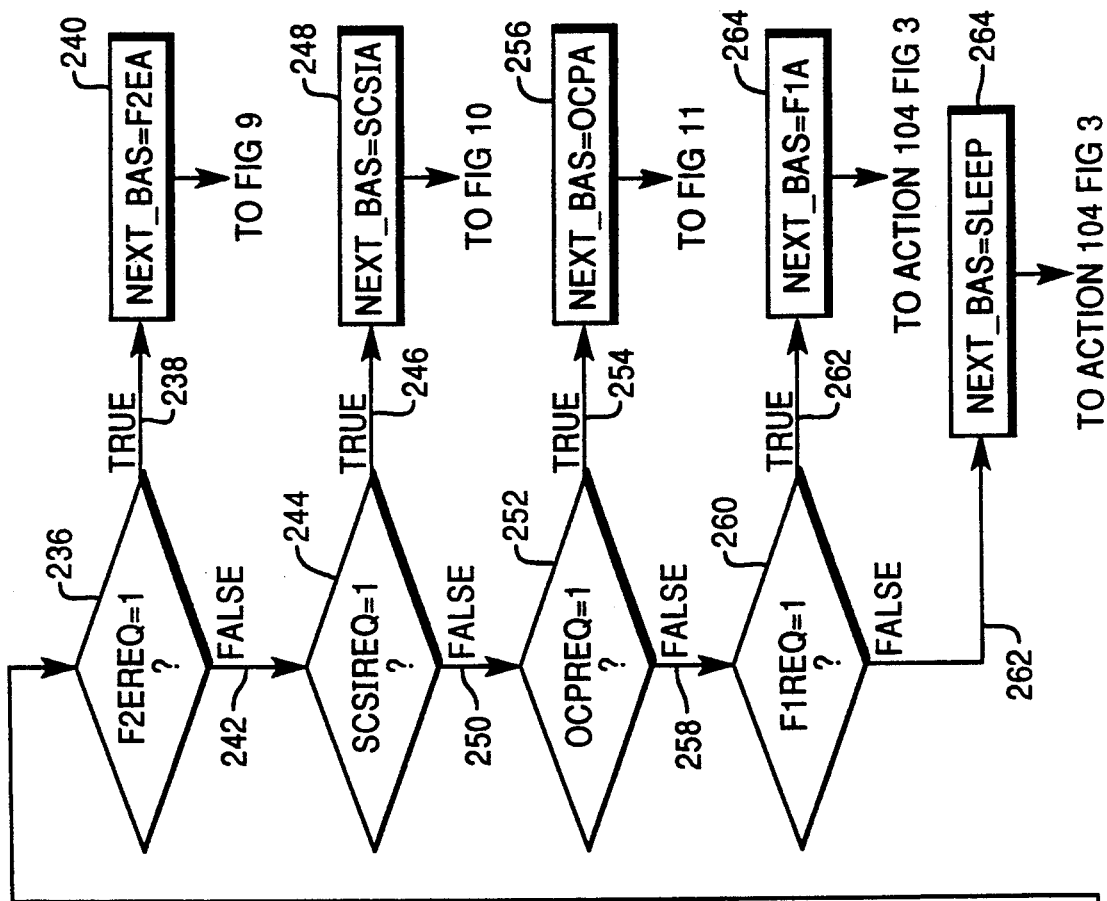
FIGS. 4–11 are further flow charts for arbitrating among a number of requesting agents for access to a shared asset.
Figure 4:
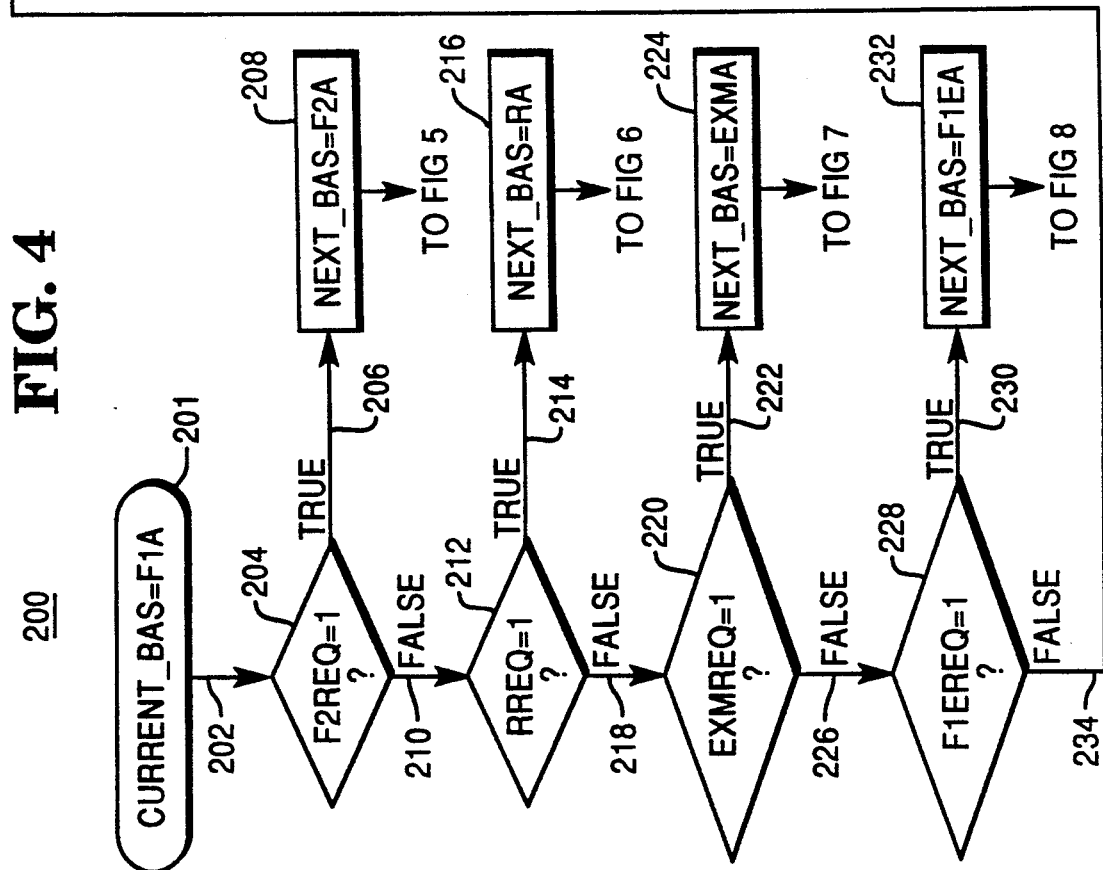
Figure 5:
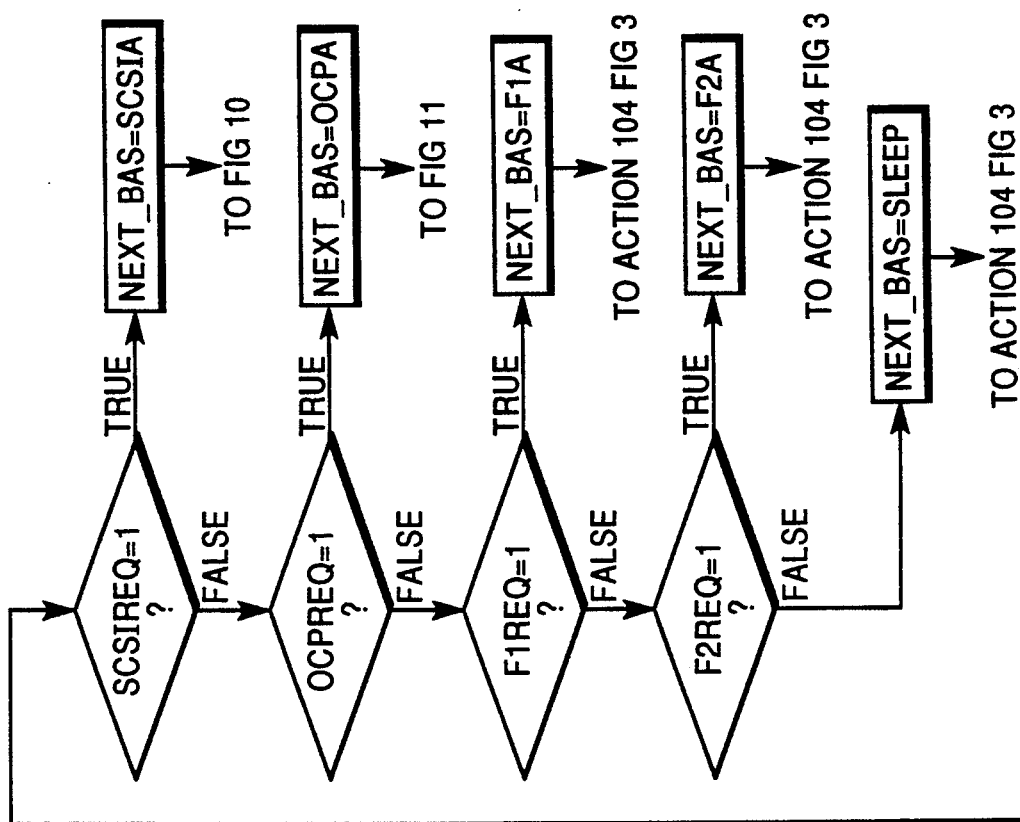
Figure 5:
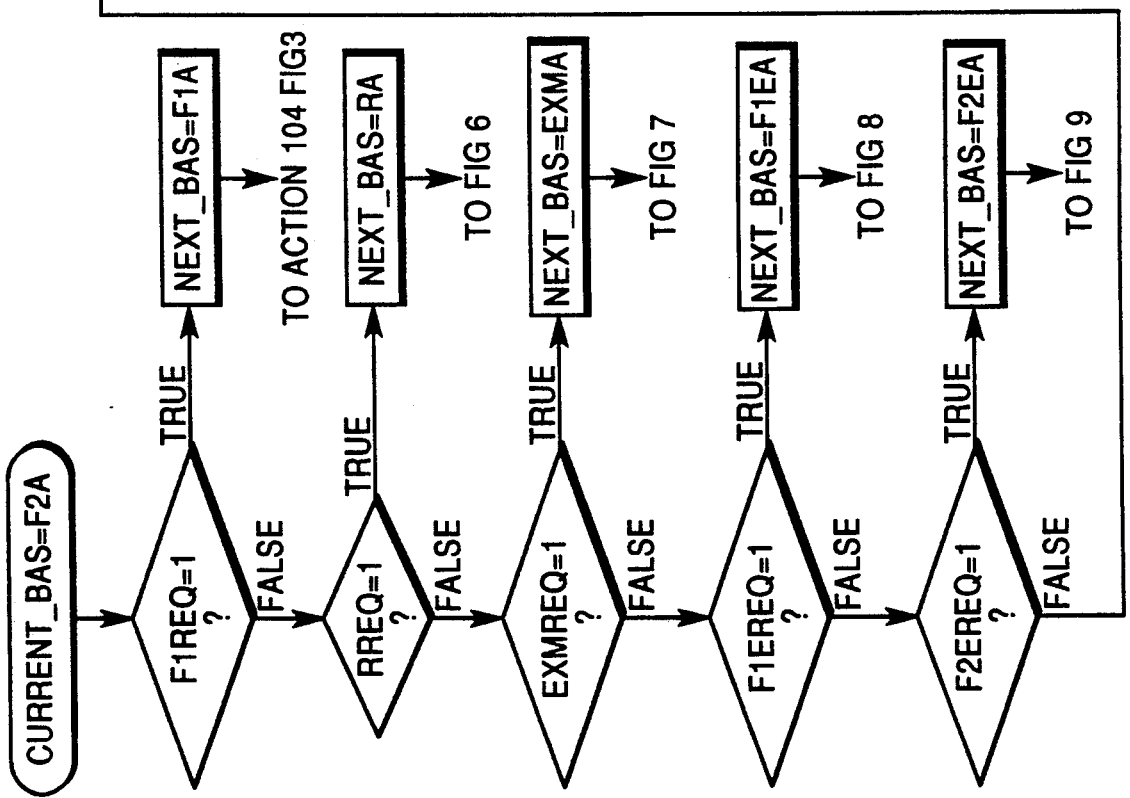
Figure 6:
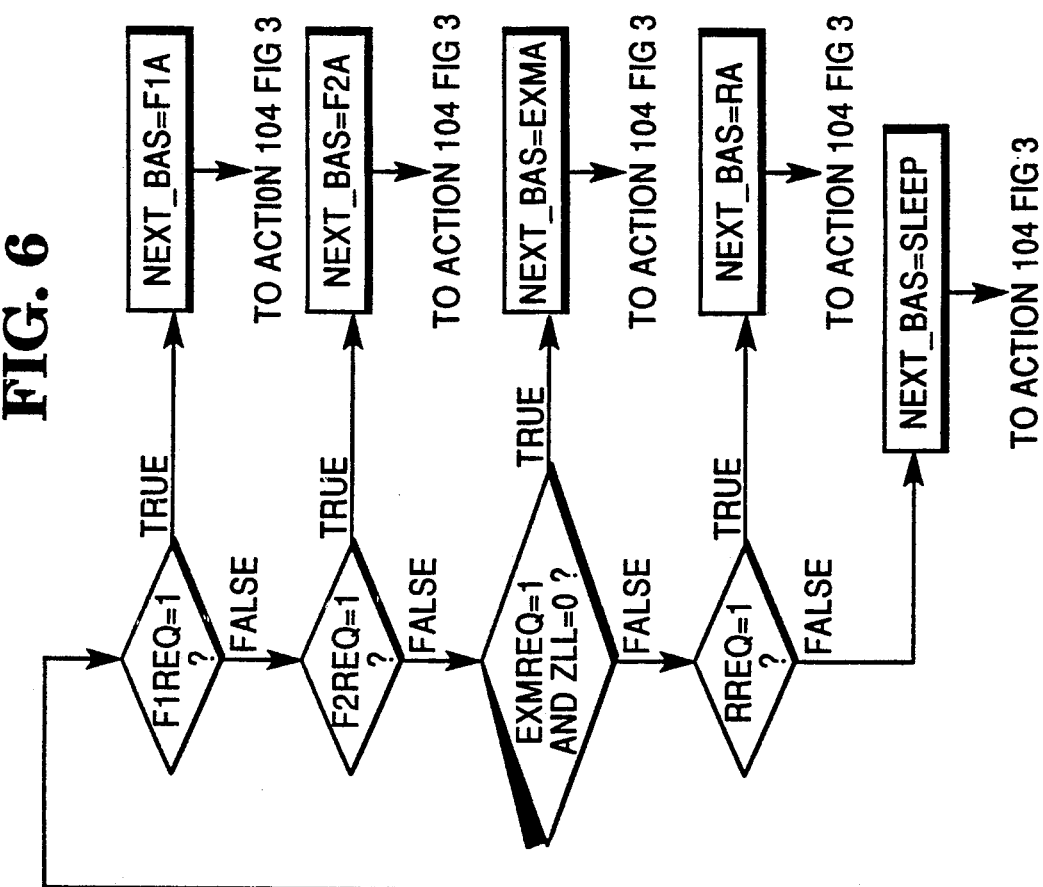
Figure 6:
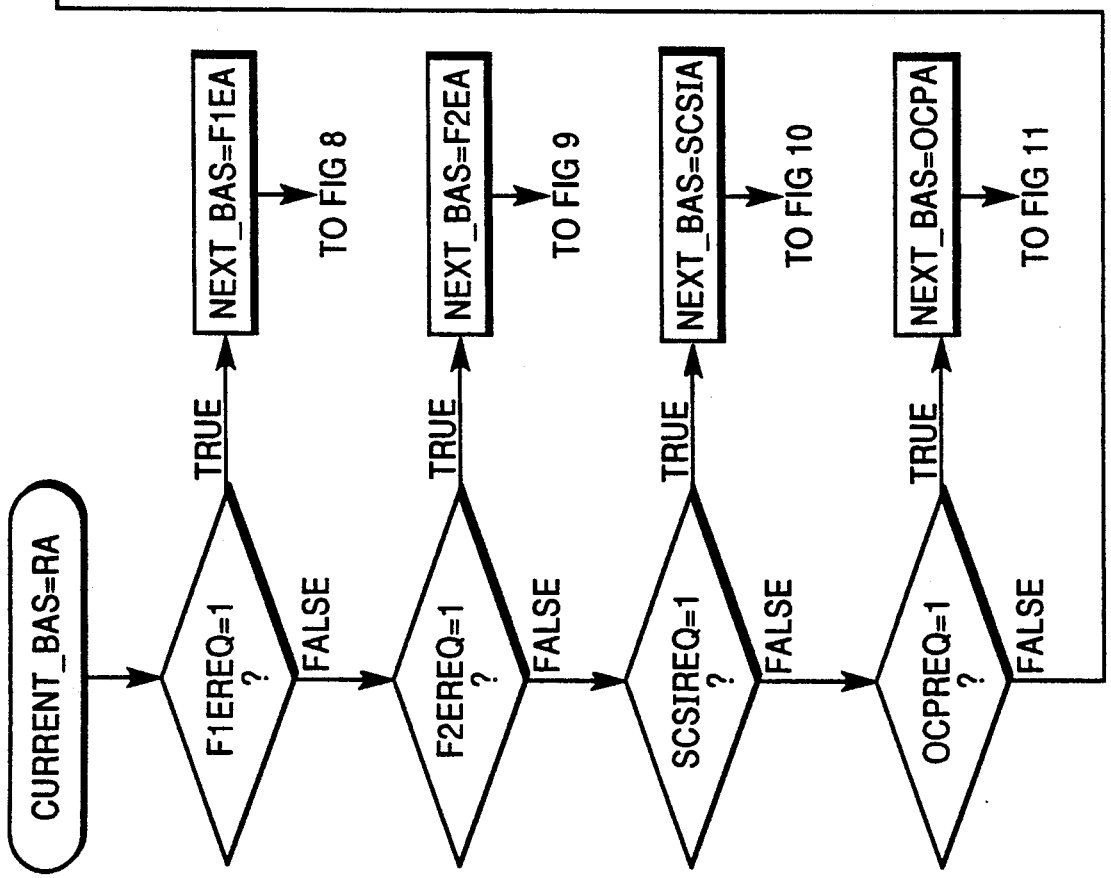
Figure 7:
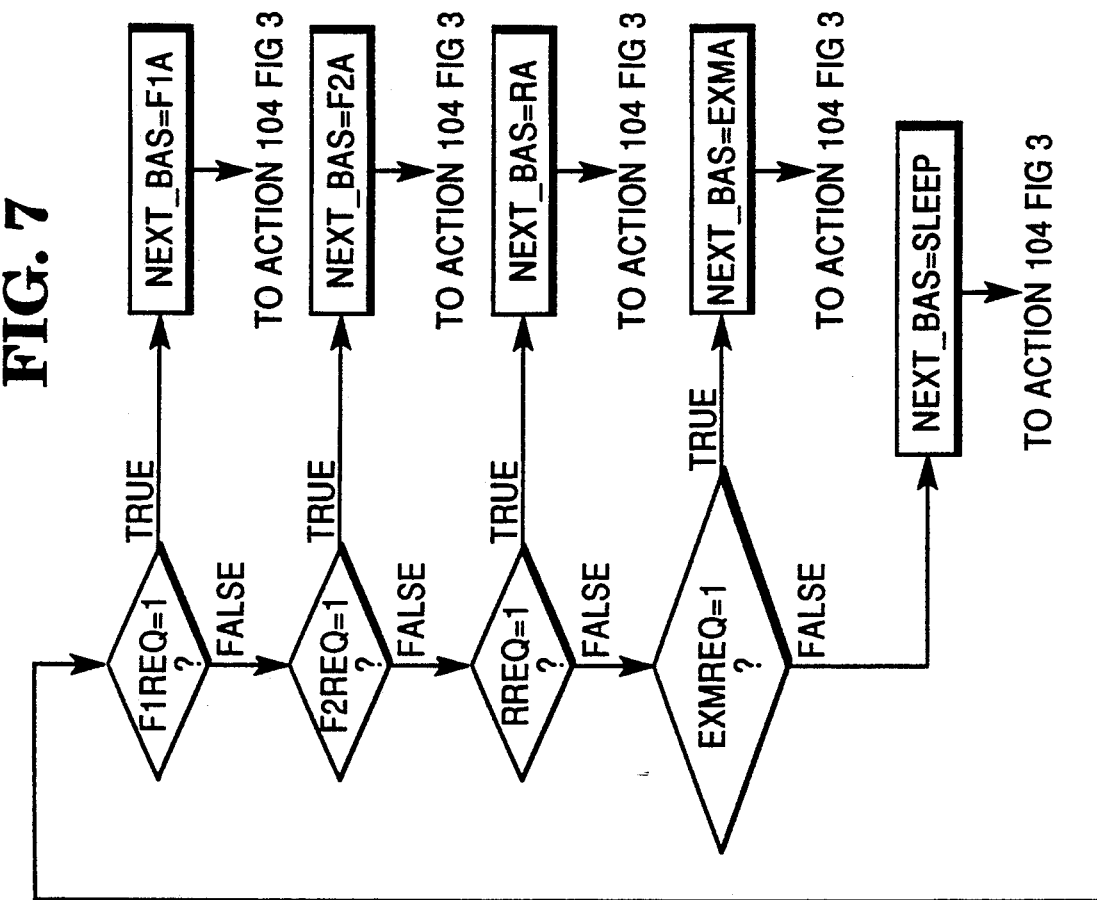
Figure 7:
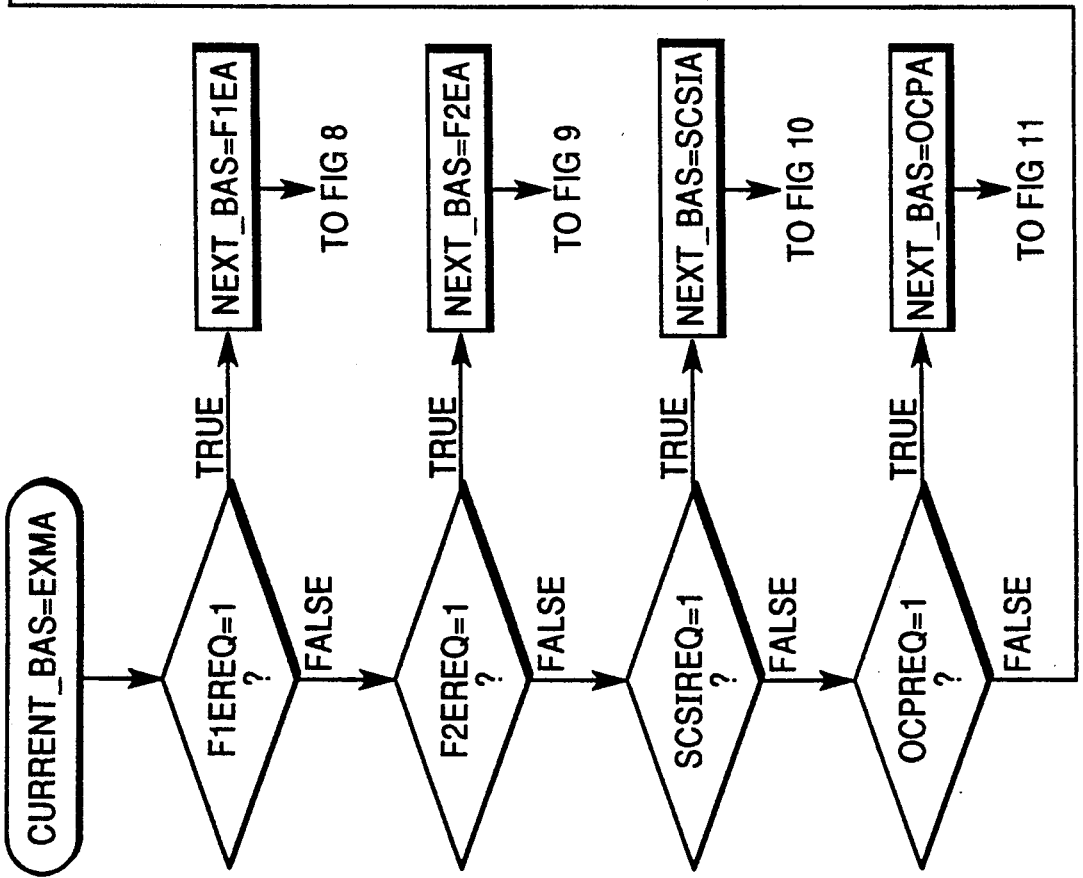
Figure 8:
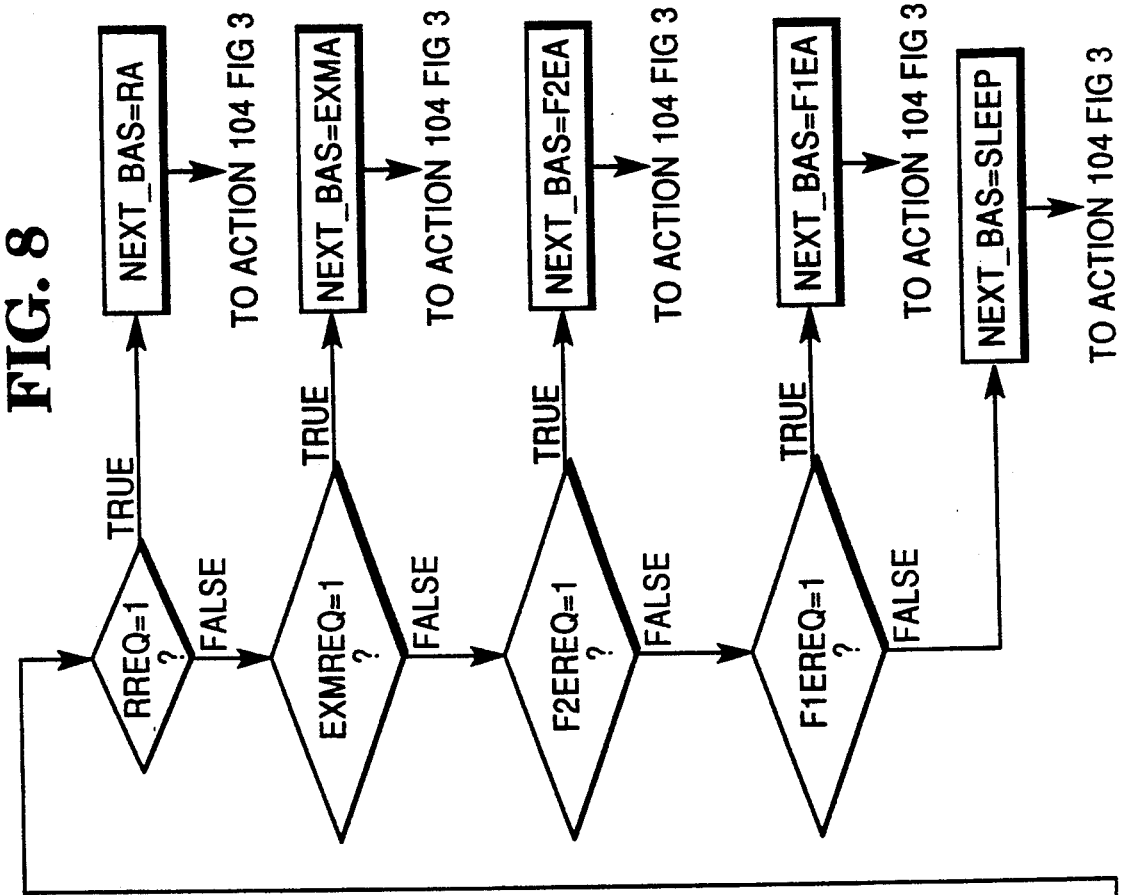
Figure 8:
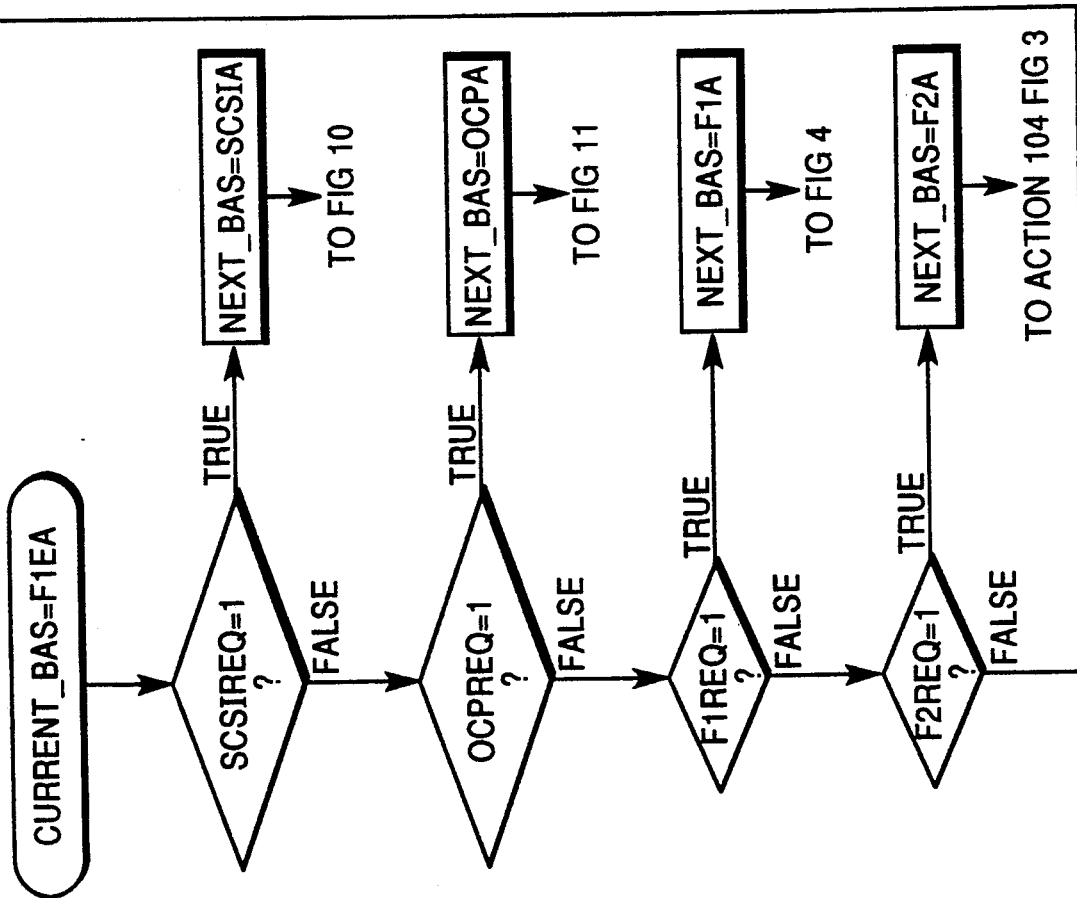
Figure 9:
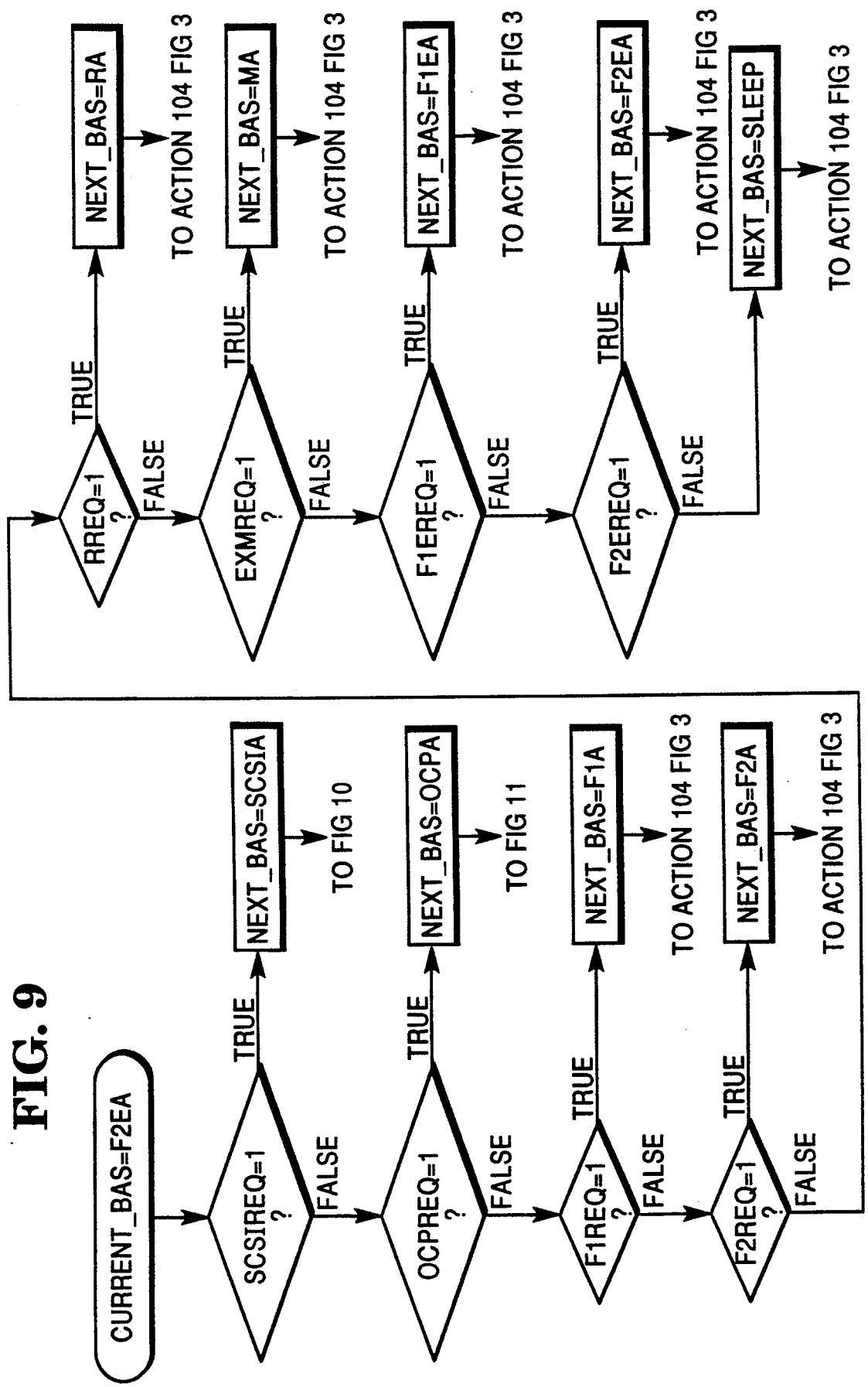
Figure 10:
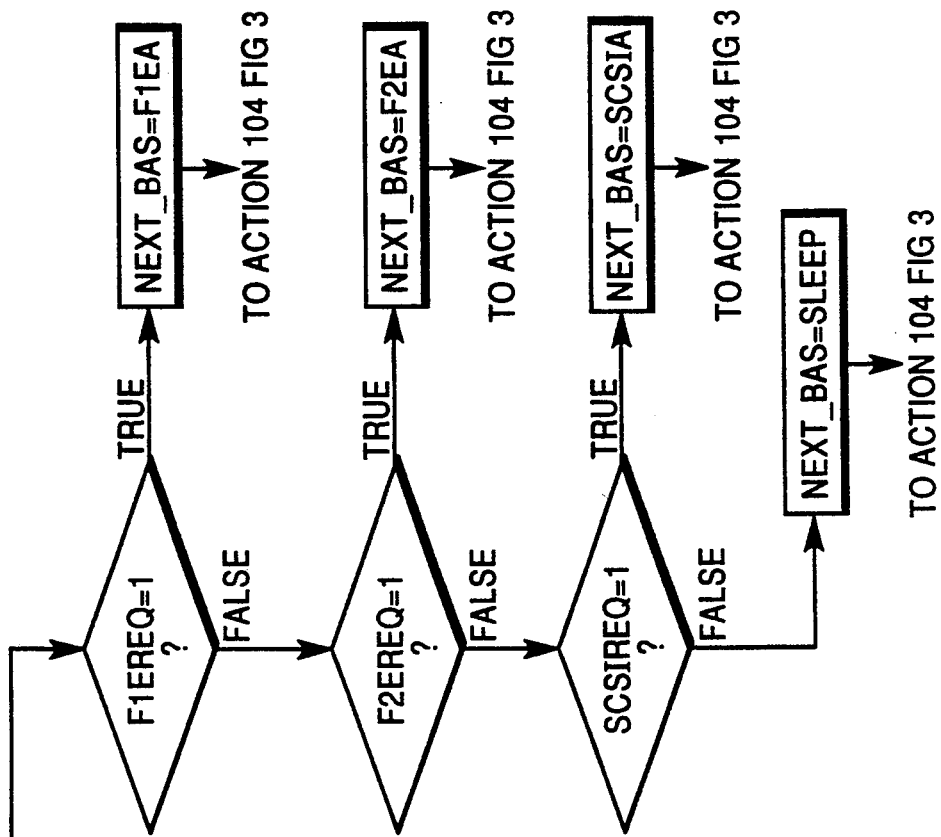
Figure 10:
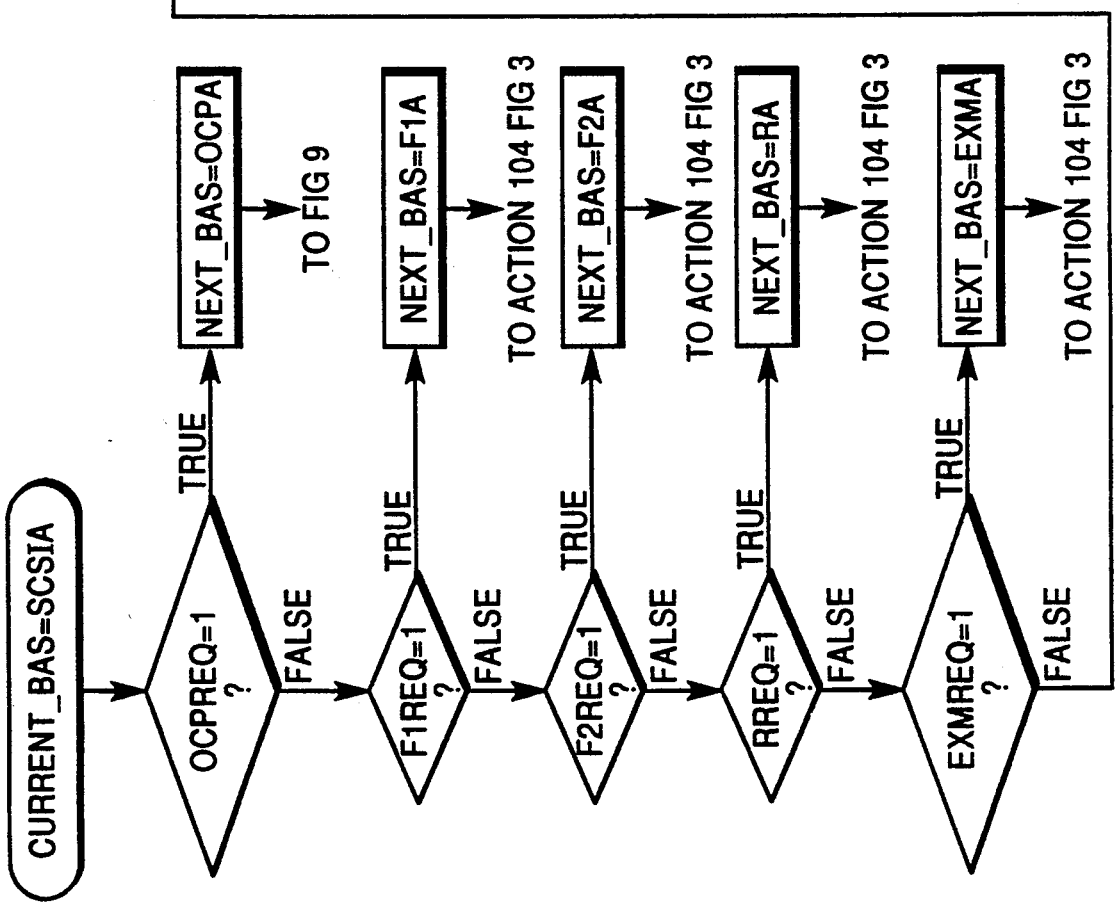
Figure 11:
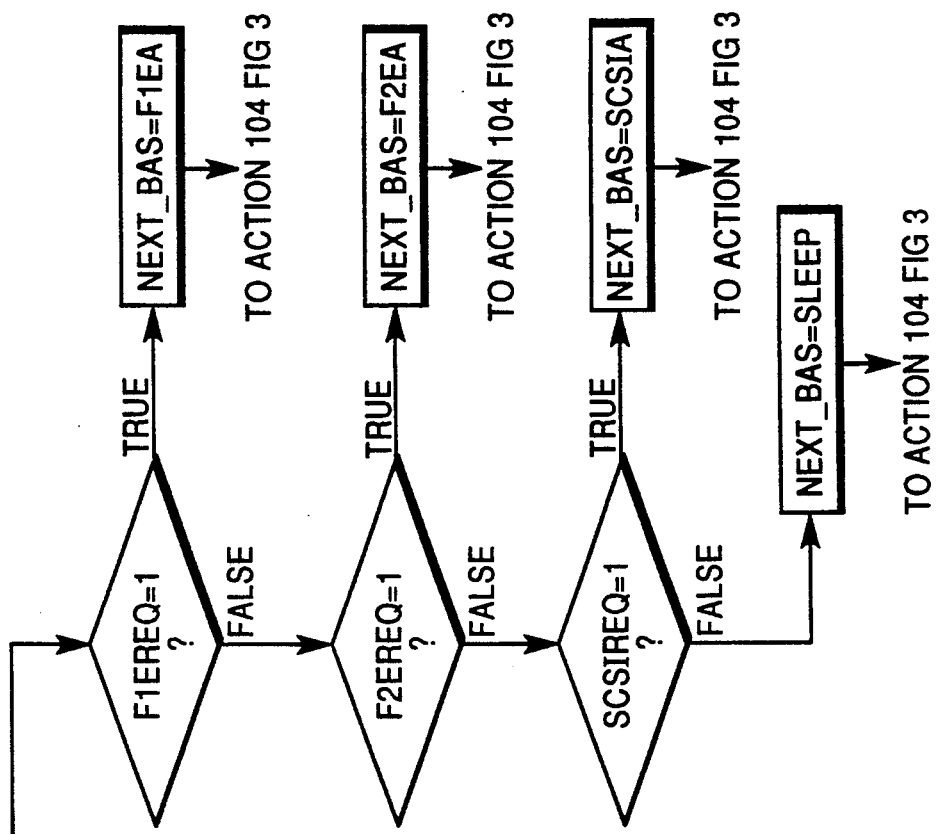
Figure 11:
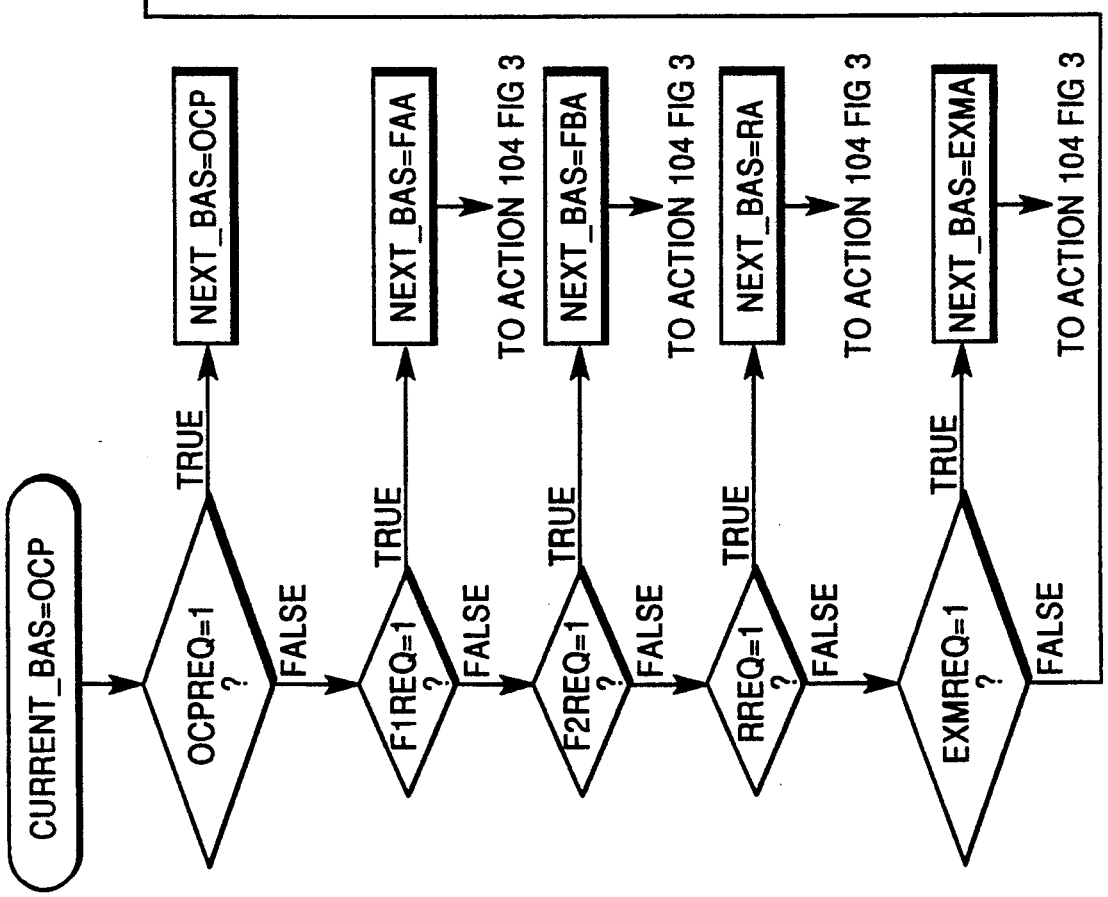

Referring now to FIG. 4, branch method 200 will be described. Branch method 200 has state 201 with current_bas assigned to F1A, which means that access is currently granted to formatter 1 interface. As long as formatter 1 interface is the only agent requesting access to the shared buffer memory 32 (shown in FIG. 2), current_bas can remain at the F1A state and provide formatter 1 interface with access to the buffer memory. As soon as a conflict for the shared buffer memory occurs, that is an agent having a maximum latency limit, requests access to the shared buffer memory, timer portion of the arbiter and timer circuit 80 is started. Current_bas F1A has a predetermined time period that the current agent, formatter 1, can continue until it must relinquish the shared buffer memory to another requesting agent with a maximum latency limit. Not all agents have a maximum latency requirement, e.g. the SCSI-DMA controller 54, because some by their nature are difficult to starve out. Further, the predetermined time period for formatter 1 is not necessarily the same as similar predetermined time periods for the other agents.

Branch method 200 progresses along path 202 from state 201 to action 204 after the predetermined time period, occasioned by a latency limited request, has expired or when formatter 1 interface no longer requests access to the shared buffer memory. At action 204 F2REQ is tested to determine if it is set to 1. If it is set to 1, branch method 200 follows path 206 to action 208, where because formatter 2 interface has requested access, next_bas is assigned the F2A state and the method proceeds to FIG. 5 with current_bas equal to next_bas.

If at action 204 F2REQ is not set to 1, then branch method 200 follows path 210 to action 212. At action 212, RREQ is tested to determine if it is set to 1. If RREQ is set to 1, which means that an access for a memory refresh is being requested, the branch method 200 follows path 214 to action 216. At action 216, next_bas is assigned the RA state and the method proceeds to FIG. 6 with current_bas equal to next_bas.

If at action 212 RREQ is not set to 1, there is no refresh request and the branch method 200 follows path 218 to action 220. At action 220 EXMREQ is tested to determine if it is set to 1. If EXMREQ is set to 1, branch method 200 follows path 222 to action 224. At action 224, next_bas is assigned to the EXMA state and the method proceeds to FIG. 7 with current_bas equal to next_bas.

If at action 220 EXMREQ is not set to 1, there is no access request by the external microprocessor and the branch method 200 proceeds along path 226 to action 228. At action 228, F1EREQ is tested to determine if it is set to 1, i.e. to determine if the error correcting circuit for formatter 1 is requesting access to the shared buffer memory. If F1EREQ is set to 1, i.e. error correcting circuit for formatter 1 is requesting access, the branch method 200 follows path 230 to action 232. At action 232, next_bas is assigned to the F1EA state and the method proceeds to FIG. 8 with current_bas equal to next_bas.

If at action 228 F1EREQ is not set to 1, then the error correcting circuit for formatter 1 is not requesting access to the shared buffer memory and the branch method 200 follows path 234 to the action 236.

At action 236, F2EREQ is tested to determine if it is set to 1, i.e. to determine if the error correcting circuit for formatter 2 is requesting access to the shared buffer memory. If F2EREQ is set to 1, i.e. error correcting circuit for formatter 2 is requesting access, the branch method 200 follows path 238 to action 240. At action 240, next_bas is assigned to the F2EA state and the method proceeds to FIG. 9 with current_bas equal to next_bas.

If at action 236 F2EREQ is not set to 1, then the error correcting circuit for formatter 2 is not requesting access to the shared buffer memory and the branch method 200 follows path 242 to the action 244.

At action 244, SCSIREQ is tested to determine if it is set to 1, i.e. to determine if the SCSI-DMA portion is requesting access to the shared buffer memory. If SCSIREQ is set to 1, i.e. SCSI-DMA portion is requesting access, the branch method 200 follows path 246 to action 248. At action 248, next_bas is assigned to the SCSIA state and the method proceeds to FIG. 10 with current_bas equal to next_bas.

If at action 244 SCSIREQ is not set to 1, then the SCSI-DMA portion is not requesting access to the shared buffer memory and the branch method 200 follows path 250 to the action 252.

At action 252, OCPREQ is tested to determine if it is set to 1, i.e. to determine if the on-chip processor is requesting access to the shared buffer memory. If OCPREQ is set to 1, i.e. the on-chip processor is requesting access, the branch method 200 follows path 254 to action 256. At action 256, next_bas is assigned to the OCPA state and the method proceeds to FIG. 11 with current_bas equal to next_bas.

If at action 252 OCPREQ is not set to 1, then the on-chip processor is not requesting access to the shared buffer memory and the branch method 200 follows path 258 to the action 260.

At action 260 F1REQ is tested to determine if it is set to 1. If it is set to 1, branch method 200 follows path 262 to action 264, where because formatter 1 interface has requested access, next_bas is assigned the F1A state. Since this is a state that is equivalent to the beginning of the branch method 200, the current dynamic loop is ended here and the method proceeds to action 104 of FIG. 3 with current_bas equal to next_bas.

If at action 260 F1REQ is not set to 1, then branch method 200 follows path 262 to action 264. At action 264, next_bas is assigned the SLEEP state with no outstanding access requests, the current dynamic loop is ended and the method proceeds to action 104 of FIG. 3 with current_bas equal to next_bas.

FIGS. 5, 6, 7, 8, 9, 10, and 11 are branch methods for current_bas equal to the F2A, RA, EXMA, F1EA, F2EA, SCSIA, and OCPA states, respectively. Because of the great similarity of FIGS. 5, 6, 7, 8, 9, 10, and 11 to FIG. 4, one of average skill in the art can understand these drawings and the branch methods they illustrate without further description.

Thus, it will now be understood that there has been disclosed a dynamic timed loop arbitor method and apparatus. While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A method of arbitrating for access to a shared resource among a plurality of agents, each having a different priority, comprising the steps of:
providing to a first agent of said plurality of agents access to said shared resource if said first agent has requested access to said shared resource;
starting a timer if there is an unfulfilled request for the shared resource by a second agent; and
after said timer reaches a predetermined value, said access of said first agent is terminated and an access by said second agent is provided.

2. A method of arbitrating for access to a shared resource according to claim 1, further comprising the step of:
setting a data bit indicating that a request by a non-latency limited agent has been made, said data bit to be used for determining priority of requesting agents;
after said access by said second agent is completed, access by said non-latency limited agent is provided.

3. A method of arbitrating for access to a shared resource according to claim 2, further comprising the step of:
after access to the shared resource has been granted to all other agents requesting such access, providing access to said shared resource to said first agent to complete its data transaction therewith.

4. A method of arbitrating for access to a shared resource among a plurality of agents, each having a different priority, comprising the steps of:
providing to a first agent of said plurality of agents access to said shared resource if said first agent has requested access to said shared resource;
starting a timer if there is an unfulfilled request for the shared resource by a latency limited agent; and
after said timer reaches a predetermined value, said access of said first agent is terminated and an access by a requesting agent that has a subsequent priority is provided.

5. A method of arbitrating for access to a shared resource according to claim 4, further comprising the step of:
after said access by said requesting agent that has a subsequent priority is completed, access by said latency limited agent is provided.

6. A method of arbitrating for access to a shared resource among a plurality of agents, each having a different priority, comprising the steps of:
providing to a first agent of said plurality of agents access to said shared resource if said first agent has requested access to said shared resource;
starting a timer if there is an unfulfilled request for the shared resource by a latency limited agent; and
after said timer reaches a predetermined value, said access of said first agent is terminated and an access by said latency limited agent is provided.

7. A method of arbitrating for access to a shared resource according to claim 6, wherein a non-latency limited agent has requested access, further comprising the step of:
after said access by said latency limited agent is completed, access by a non-latency limited agent is provided.

8. A circuit for controlling access to a shared resource among a plurality of agents, each having a different priority, comprising:
a timer for timing when there is an unfulfilled request for the shared resource by a second agent; and
means for:
providing access to said shared resource by a first agent of said plurality of agents that has requested access to said shared resource;
storing a predetermined value representing a predetermined period of time, with said predetermined value being used as a preset value for said timer;
starting said timer if there is an unfulfilled request for the shared resource by said second agent; and providing that after said timer reaches said predetermined value, said access of said first agent is terminated and an access by said second agent is provided;

wherein said means are connected to said timer.

9. A circuit for controlling access to a shared resource among a plurality of agents according to claim 8, wherein said means further:

stores a second predetermined value representing a second predetermined time period, with said second predetermined value being used as a preset value for said timer;

starts said timer if there is an unfulfilled request for the shared resource by another agent that has a latency limit; and terminates said access by said second agent after said second predetermined time period has expired if there is an unfulfilled request for the shared resource by another agent that has a latency limit.

10. A circuit for controlling access to a shared resource among a plurality of agents according to claim 9, further comprising:

means for accessing the shared resource by a non-latency limited agent after access by said second agent is completed.

* * * * *